(12) United States Patent
Aho

(10) Patent No.: US 7,153,392 B2
(45) Date of Patent: Dec. 26, 2006

(54) OIL SIPHON

(75) Inventor: Erkki Aho, Elimäki (FI)

(73) Assignee: Vaahto Oy, Hollola (FI)

( * ) Notice: Subject to any disclaimer, the term of this patent is extended or adjusted under 35 U.S.C. 154(b) by 611 days.

(21) Appl. No.: 10/270,481

(22) Filed: Oct. 16, 2002

(65) Prior Publication Data
US 2003/0079849 A1 May 1, 2003

(30) Foreign Application Priority Data
Oct. 26, 2001 (FI) .................. 20012083

(51) Int. Cl.
*D21F 3/02* (2006.01)
*D21F 3/08* (2006.01)

(52) U.S. Cl. .................. 162/358.3; 162/272; 100/118; 100/153; 100/336; 492/20

(58) Field of Classification Search ........ 162/205–207, 162/358.1, 358.3, 358.5, 199, 272, 361, 373, 162/374; 165/89–91; 34/113–123; 100/118, 100/153, 334–336; 492/7, 20
See application file for complete search history.

(56) References Cited

U.S. PATENT DOCUMENTS 4,555,305 A * 11/1985 Steiner et al. .............. 162/205

5,084,137 A * 1/1992 Ilmarinen et al. ........... 162/272
6,355,143 B1 * 3/2002 Kilian et al. ................ 162/199

FOREIGN PATENT DOCUMENTS

DE          44 02 754       * 6/1994
WO          WO 00/70143     * 11/2000

* cited by examiner

*Primary Examiner*—Eric Hug
(74) *Attorney, Agent, or Firm*—Birch, Stewart, Kolasch & Birch, LLP

(57) ABSTRACT

A shoe roll of a shoe press for use in a papermaking machine, the shoe roll including a blanket, or endless belt, which houses a shoe assembly that, in cooperation with an external backing roll, forms an extended nip proper. The shoe press includes an oil circulation piping system for removing the oil from the interior of the shoe roll and transferring the oil to an oil trap during the running of the machine, whereby the piping system also includes a suction fan connected thereto. The device is implemented by way of connecting an oil siphon to the oil circulation piping system, the oil siphon adapted to move towards and away from the blanket in the interior of the shoe roll so that, when the roll is stopped, the siphon removes the excess oil from the interior of the blanket by a pressure differential generated by of the suction fan.

8 Claims, 3 Drawing Sheets

A - A

OIL SIPHON

This nonprovisional application claims priority under 35 U.S.C. § 119(a) on Patent Application No. 20012083 filed in Finland on Oct. 26, 2001, which is herein incorporated by reference.

The present invention relates to a shoe roll of a shoe press used in a papermaking machine, the shoe roll comprising an endless belt, or a blanket; which houses a shoe assembly that in cooperation with an external backing roll forms an extended nip proper and the shoe press including an oil circulation piping system performing the removal of oil from the interior of the shoe roll to an oil trap during the running of the machine, whereby the piping system also comprises a suction fan connected thereto.

During its operation, the blanket of the shoe roll of the shoe press requires a copious volume of oil for lubrication and cooling. Hence, stopping of the roll rotation leaves in its interior a large volume of oil that cannot be removed by conventional arrangements.

In fact, prior shoe presses have lacked a separate oil removal system to cope with situations in which the roll is stopped. The greatest problem herein has especially arisen from the oil that remains in the interior of the roll and obviously lands on the bottom of the blanket. This has resulted in bagging of the blanket, whereby in worst situations it has been necessary to attempt a remedy to the problem by providing external support to the blanket. Since the oil quantity in the interior of the roll blanket may be amounted to hundreds of liters, complications have arisen in the replacement of the blanket so that the blanket replacement becomes tardy.

It is an object of the present invention to solve the removal of oil from the interior of the shoe roll of a shoe press in a papermaking machine in a simple fashion. The goal of the invention is achieved by an arrangement characterized in that to the oil circulation piping is connected an oil siphon adapted movable along the blanket in the interior of the shoe roll so that the excess oil can be removed by means of the siphon during the time the roll is stopped from the interior of the blanket by a pressure differential generated by of the suction fan.

A preferred embodiment of the invention is characterized in that the oil siphon is provided with an actuator adapted to elevate the oil siphon into an upper position when the papermaking machine is running and then to sink the siphon operational into a lower position when the machine is stopped.

Another preferred embodiment of the invention is characterized in that the actuator comprises a single-stroke hydraulic cylinder that implements the siphon elevation movement by spring force and the operational siphon sink movement by hydraulic force.

A still another preferred embodiment of the invention is characterized in that, when the machine is stopped, the shut-off valve of the oil siphon piping is driven open, whereby the pressure differential generated by the suction fan vacuums oil out from the interior of the shoe roll blanket.

The arrangement needs a very simple construction inasmuch as it operates without a separate oil suction pump, but instead, its operation is based on the existing oil removal system that can be found in any shoe press.

Next, the invention is described in detail with the help of preferred exemplary embodiments by making reference to the appended drawings in which FIG. 1 is an end view of a shoe press;

Figure 1:
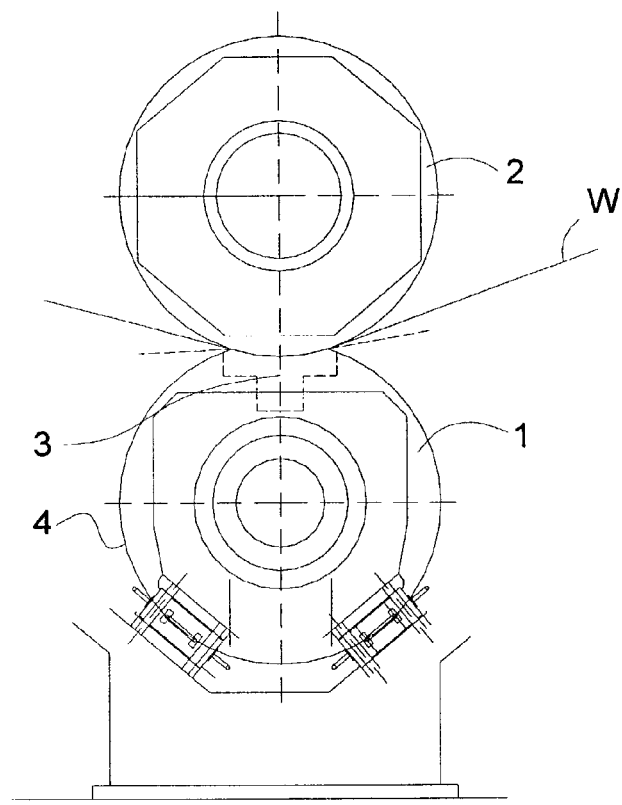

In FIG. 1 is generally shown a shoe press. Reference numeral 1 denotes a shoe roll incorporating in the interior of an endless belt, or blanket 4, a shoe assembly 3 that forms the extended-nip proper. Respectively, reference numeral 2 denotes a backing roll against which the shoe roll 1 presses a paper web W. Herein, the present invention relates to oil removal in a stopped papermaking machine from the interior of shoe roll 1 with the help of existing oil removal piping.

Figure 2:
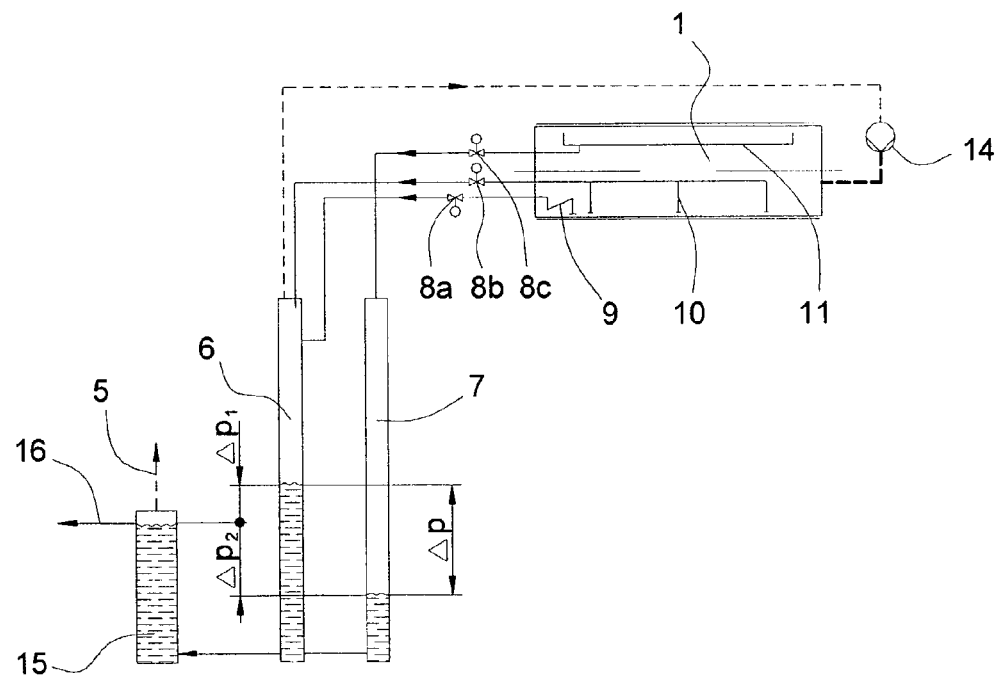
FIG. 2 is a diagrammatic layout of the oil removal system of a shoe press.
Figure 3:
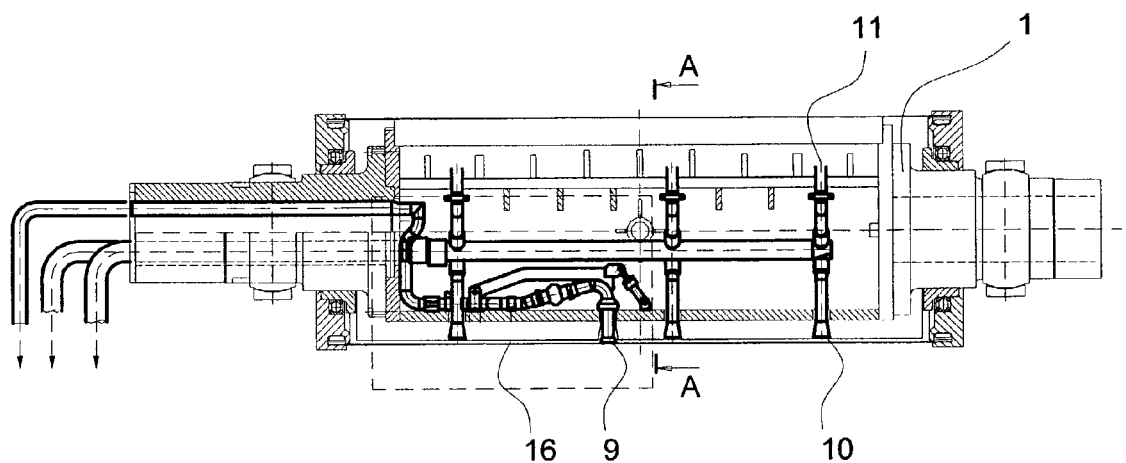
FIG. 3 is a cross-sectional side elevation view of the internal piping of a shoe roll complemented with an oil siphon according to the invention.
Figure 4:
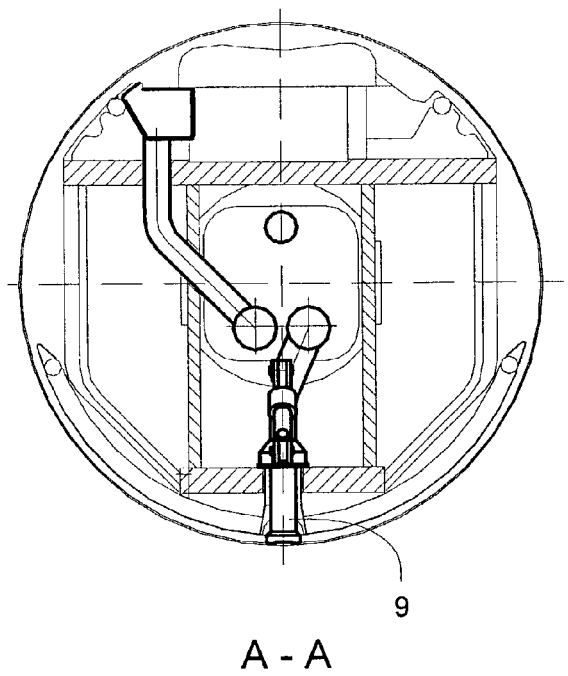
FIG. 4 is sectional view of FIG. 3 taken along plane A—A when the oil siphon is driven into its operating position.

In FIG. 2 is shown diagrammatically a layout of the entire oil removal system. Also in this diagram, reference numeral 1 denotes the shoe roll. Oil removal takes place with the help of a pressure differential generated by means of a suction fan 14. Reference numeral 15 denotes an oil trap, while reference numerals 16 and 7 denote the removal of oil from the system. In a running machine, fixed piping 11 carries oil from the trough located in the upper portion of the shoe roll interior into an oil discharge pipe 7. Respectively, oil is removed from the bottom of the blanket via fixed siphon pipes 10 into a second oil discharge pipe 6. The discharge flow of oil is accomplished by means a pressure differential generated with the help of a suction fan. The flow paths can be controlled by means of shut-off valves 8b and 8c mounted on the piping 10 and 11. During the running of the papermaking machine, a constant level of overpressure and pressure differential is maintained between the oil discharge pipes 6 and 7 as indicated below.

$\Delta p_1$=vacuum contribution by suction fan 14 in pressure differential $\Delta p$ $\Delta p_2$=overpressure contribution in pressure differential $\Delta p$, or in other terms, the overpressure in the interior of blanket 4.

Figure 6:
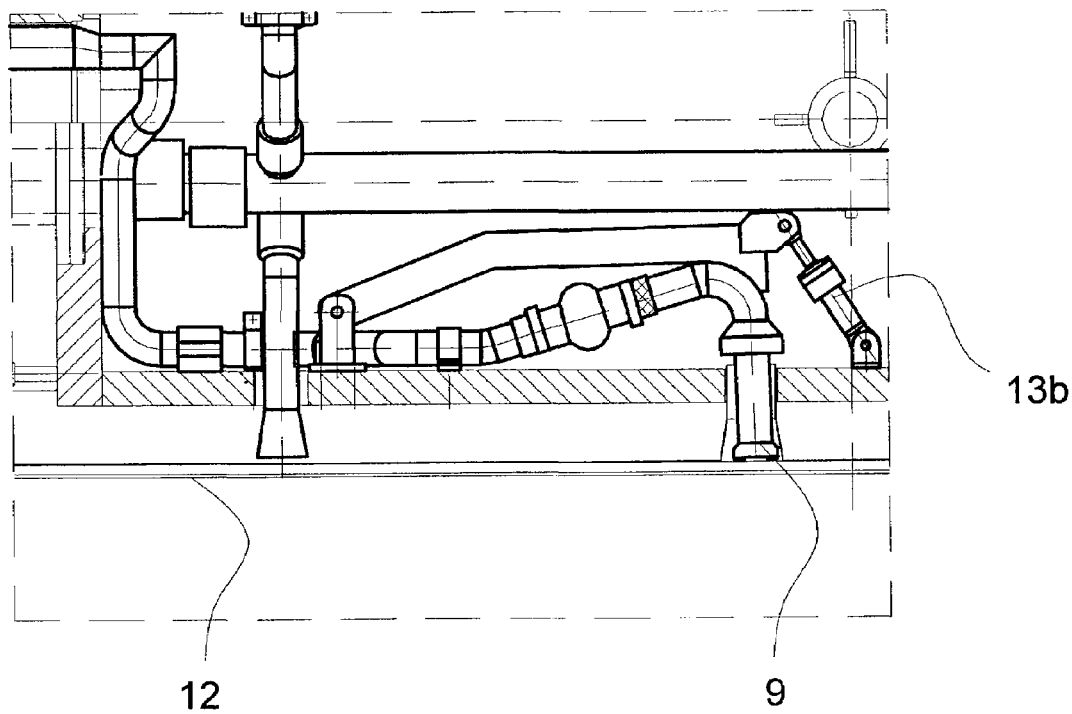
FIG. 6 a sectional view similar to that of FIG. 5 having the oil siphon now elevated into its upper position.

The present invention proper is directed to the oil siphon denoted by reference numeral 9 that during the running of the papermaking machine is kept apart from the roll blanket in an elevated home position (FIG. 6). In this state, shut-off valve 8a is closed, whereby the pressure in the suction pipe leaving the oil siphon is unperturbed and the spring of single-stroke hydraulic cylinder 13 (13b in FIG. 6) elevates the siphon pipe home into its upper position. Valves 8b and 8c are kept in their open positions.

Figure 5:
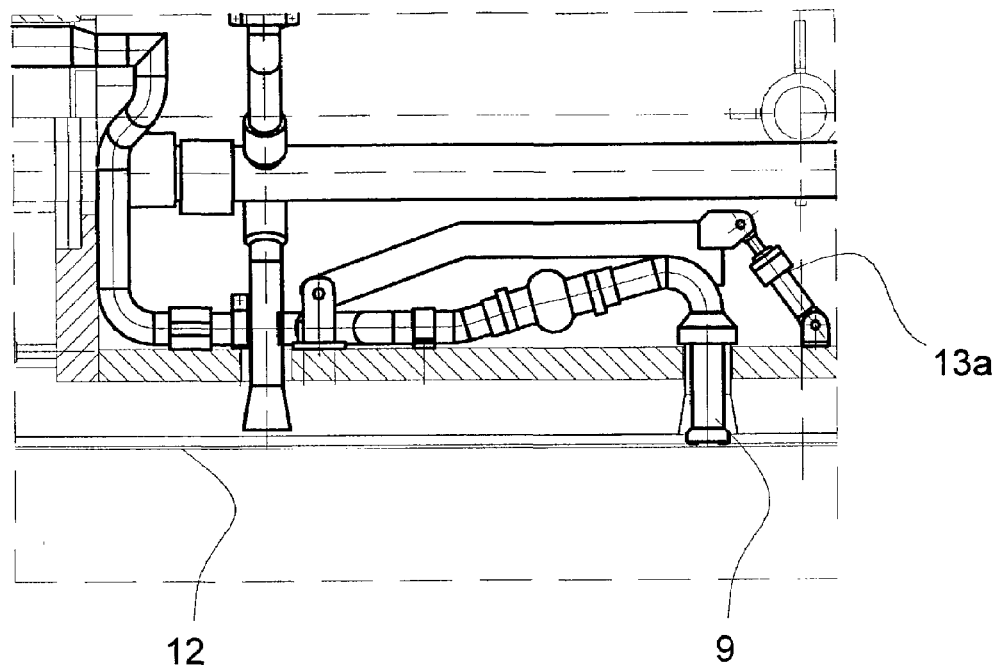
FIG. 5 is a sectional view similar to that of FIG. 2 having the oil siphon operational in its lower position.

After the machine is stopped, to the rod side of hydraulic cylinder 13 is applied a hydraulic pressure sufficiently high to overcome the spring force, whereby the oil siphon 9 is lowered onto the bottom of the blanket so deep that it meets the inner surface of the blanket 12 (FIG. 5). Herein, the hydraulic cylinder is in its retracted position 13a. Next, the shut-off valve 8a of the piping connected to the oil siphon 9 is opened and, with the help of the pressure differential generated in the piping by the suction fan 14, excess oil is removed from the interior of the shoe roll blanket. During this operation, valves 8b and 8c close automatically.

When the papermaking machine is again started, shut-off valve 8a is closed, fluid pressure to the hydraulic cylinder is shut off and the spring force of the cylinder elevates the oil siphon into its upper position. Hence, the arrangement is implemented in a very simple fashion, since oil siphon 9 does not need a separate suction pump, but rather, its operation is based on an existing oil discharge system normally used during the running of the papermaking machine. Reference numeral 5 in the diagram refers to a breather.

To a person versed in the art it is obvious that the invention is not limited to the above-described exemplary embodiment, but rather, may be modified within the scope and spirit of the appended claims.

What is claimed is:

1. A shoe press used in a papermaking machine, comprising:
    a shoe roll with a blanket which houses a shoe assembly that, in cooperation with an external backing roll, forms an extended nip proper;
    an oil circulation piping system for removing oil from an interior of the shoe roll and transferring the oil to an oil trap while the machine is running;
    a suction fan connected the piping system; and
    an oil siphon connected to the oil circulation piping system, the oil siphon being adapted to move towards and away from the blanket in the interior of the shoe roll so that, while the roll is stopped, excess amounts of the oil can be removed from the interior of the blanket by means of the siphon by a pressure differential generated by the suction fan,
    wherein the oil siphon is provided with an actuator adapted to elevate the oil siphon into an upper position when the papermaking machine is running and to sink the siphon operational into a lower position when the machine is stopped.

2. The shoe press of claim 1,
    wherein the actuator comprises a single-stroke hydraulic cylinder that implements a siphon elevation movement by spring force and an operational siphon sink movement by hydraulic force.

3. The shoe press of claim 1,
    wherein, when the machine is stopped, a shut-off valve of the piping system connected to the oil siphon is driven open, whereby the pressure differential generated by the suction fan vacuums the oil out from the interior of the shoe roll blanket.

4. The shoe press of claim 1, wherein the shoe roll is an endless blanket.

5. A shoe press used in a papermaking machine, comprising:
    a shoe roll with a blanket, or an endless belt, which houses a shoe assembly that, in cooperation with an external backing roll, forms an extended nip proper;
    an oil circulation piping system for removing oil from an interior of the shoe roll and transferring the oil to an oil trap while the machine is running;
    a suction fan connected the piping system; and
    an oil siphon connected to the oil circulation piping system, the oil siphon being adapted to move towards and away from the blanket in the interior of the shoe roll so that, while the roll is stopped, excess amounts of the oil can be removed from the interior of the blanket by means of the siphon by a pressure differential generated by the suction fan,
    wherein the oil siphon is provided with an actuator adapted to elevate the oil siphon into an upper position when the papermaking machine is running and to sink the siphon operationally into a lower position when the machine is stopped,
    wherein the actuator comprises a single-stroke hydraulic cylinder that implements a siphon elevation movement by spring force and an operational siphon sink movement by hydraulic force,
    wherein, when the machine is stopped, a shut-off valve of the piping system connected to the oil siphon is driven open, whereby the pressure differential generated by the suction fan vacuums the oil out from the interior of the shoe roll blanket.

6. The shoe press of claim 5, wherein the shoe roll is an endless blanket.

7. A shoe press used in a papermaking machine, comprising:
    a shoe roll with a blanket, or an endless belt, which houses a shoe assembly that, in cooperation with an external backing roll, forms an extended nip proper;
    an oil circulation piping system for removing oil from an interior of the shoe roll and transferring the oil to an oil trap while the machine is running;
    a suction fan connected the piping system; and
    an oil siphon connected to the oil circulation piping system, the oil siphon being adapted to move towards and away from the blanket in the interior of the shoe roll so that, while the roll is stopped, excess amounts of the oil can be removed from the interior of the blanket by means of the siphon by a pressure differential generated by the suction fan,
    wherein, when the machine is stopped, a shut-off valve of the piping system connected to the oil siphon is driven open, whereby the pressure differential generated by the suction fan vacuums the oil out from the interior of the shoe roll blanket.

8. The shoe press of claim 7, wherein the shoe roll is an endless blanket.

* * * * *